Feb. 15, 1944.  J. T. SCULLY  2,341,665
SHEARING DEVICE
Filed Dec. 16, 1938
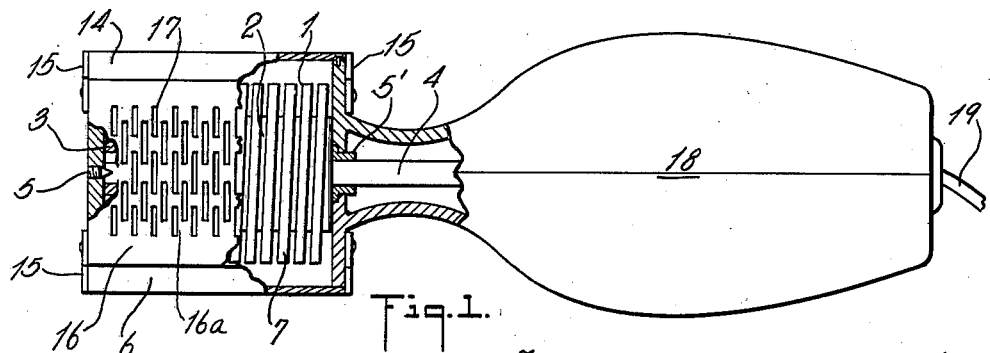
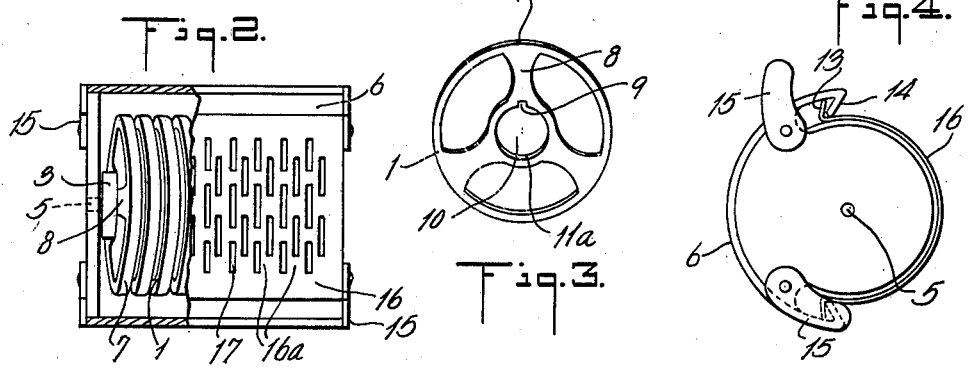
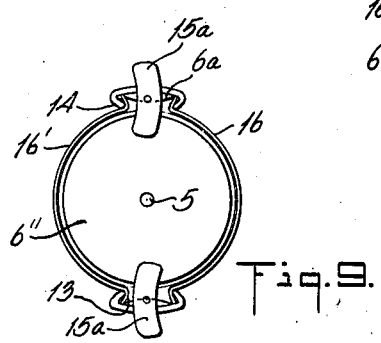
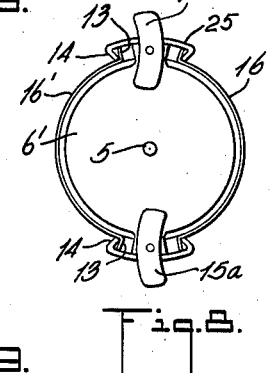
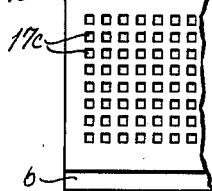
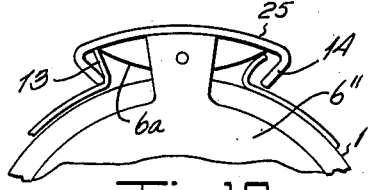
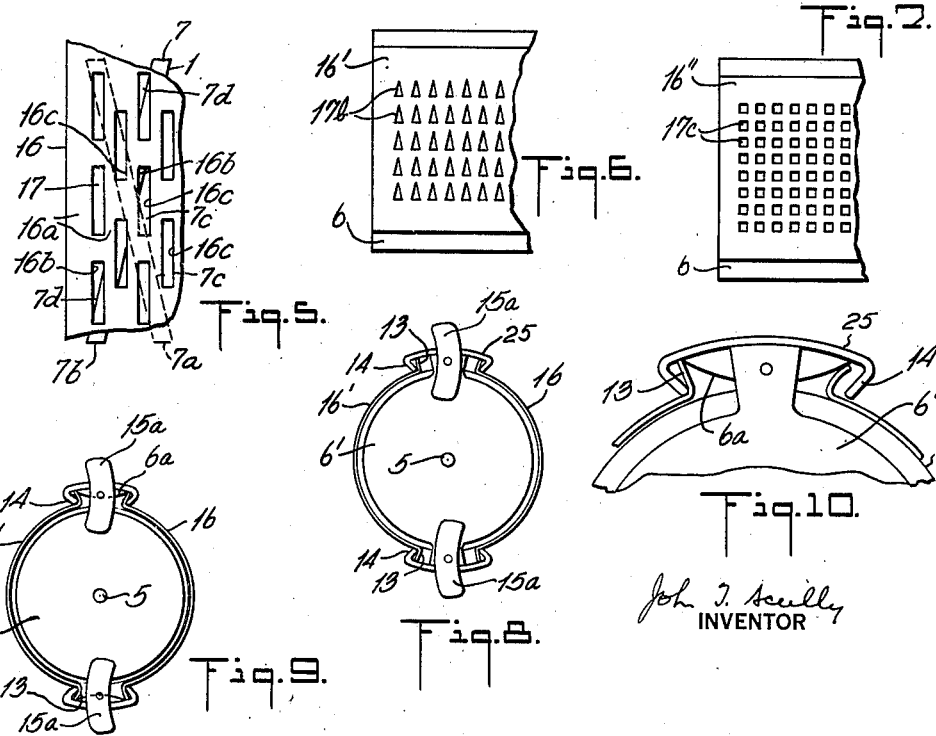
John T. Scully
INVENTOR Patented Feb. 15, 1944

2,341,665

UNITED STATES PATENT OFFICE 2,341,665

SHEARING DEVICE

John T. Scully, Lawrence, N. Y.

Application December 16, 1938, Serial No. 246,036

26 Claims. (Cl. 30—43)

This invention relates to shearing devices such as hair cutting machines and has especial reference to power driven hair cutters or razors wherein a movable cutter member operates behind, and in conjunction with, a shearing member, the members being provided with edges which cooperate to cut hair, and such devices being commonly referred to as dry shavers.

A principal object of the invention is the provision in an inner cutter member assembly of a cutter element so shaped and suspended in such relationship to the outer shearing member as to cause a highly efficient shearing action when the inner cutter is rotated partially or completely.

A further important object is the provision of a rotary cutter in which the cutting edge of a radial blade is obliquely inclined to the axis of rotation and in which the blade is of such construction and shape as to reduce to a minimum the risk of axial distortion during the tempering process in manufacture.

A further important object is the provision in a power razor, wherein one of the cooperating shear-cutting members is adapted for radial movement relative to another shear-cutting member, of a rotary inner cutter member having radially projecting peripheral cutting edges inclined to an outer shear member in different directions and in which, during the shaving operation, the inner cutter member is in circumferentially continuous peripheral engagement with the outer shear member.

A further important object is the provision of a shaving device having cooperating shear-cutting members in which a resilient outer shear member having a curved shearing zone is supported in such manner as to be movable as a whole radially inwardly relatively to the inner cutter member during or after wear of the members or, if desired, before wear.

A still further object is the provision of a shaving device having co-operative shear cutting members in which the outer shear member presents a large area of shear edges cooperative with an inner rotary cutter member presenting cutting edges inclined to the outer shear member successively in opposite directions and which inner cutter is provided with blades adapted for circumferentially continuous peripheral engagement with the outer member and is also provided with circumferentially continuous hair-receiving slots between the peripheries of the blades.

A further important object is the provision in a shaving device of an arcuately curved resilient outer shear member supported in a manner in which the radius of its curvature can be reduced to compensate for the tendency to eccentricity between the outer shear member and an arcuately travelling inner cutter member.

A further important object is the provision of a shaving device in which a plurality of outer shearing panels are arranged, relatively, to engage the skin at different times and to cooperate with inner cutting means movably mounted for slidable cooperation with the inner surfaces of the outer shearing panels, which will permit the user to shift back and forth from the use of one outer shearing panel to another during the shaving operation, and allow the panels to alternately cool off from frictionally generated heat.

A still further important object is the provision of a shaving device having a rotary inner cutter member in which the cutting edges of the cutter are successively inclined in opposite oblique directions to a plurality of arcuate outer shear members supported in circumferentially spaced relationship to each other, and the provision in one of the outer shear members of hair-receiving slots adapted to receive relatively long or relatively short hairs, and the provision in another of the outer shear members of relatively smaller hair-receiving openings, closely grouped longitudinally and transversely spaced and adapted to receive relatively short and short hairs.

A further important object is the provision in a rotary cutter of a radial blade which is easily sharpened in manufacture to a sharp peripheral edge, which is of relatively light weight, and beneath portions of the periphery of which cut hair may pass laterally, or be blown, during shaving or cleaning.

A further object is the provision of a detachably supported outer shear member cooperative with radial blades of an arcuately travelling inner cutter, and which outer member is easily removed and can be repositioned upside down or with its ends reversed without reduction in area of its hair-receiving zone, without relative lateral displacement of its hair-receiving openings to the inner cutter blades, and which will effectively cooperate with the inner cutter to cut hair.

A further important object is the provision in a shaving device utilizing a rotary cutter of an outer shear member movably supported relatively to the walls of the cutter housing and in which the shearing zone of the device projects radially outwardly of, or radially ahead of, longitudinally spaced end walls of the housing.

Other objects will hereinafter be apparent from the description and upon reference to the drawing.

The invention resides substantially in the construction, combination, arrangement, relative location of, and co-action of, parts as will be described in connection with the accompanying drawing, in which, Fig. 1 is a side view with parts in elevation, in section, and broken away.

Fig. 2 is a side view with parts in elevation, in section, and broken away, and showing parts shown in Fig. 1 in a changed position.

Fig. 3 is a side view of an inner cutter blade as viewed perpendicularly to its side.

Fig. 4 is an end view of the head shown in Figs. 1 and 2.

Fig. 5 is a fragmentary diagrammatic plan view of the action of parts.

Fig. 6 is a fragmentary elevation of a modification of an outer shear member.

Fig. 7 is a fragmentary elevation of a further modification of outer shear member.

Fig. 8 is a view of a modification of the shearing head.

Fig. 9 is an end view of a modification of the shearing head.

Fig. 10 is an enlarged fragmentary end view with a part omitted showing the outer shear members of Fig. 9 as movable inwardly and outwardly radially relatively to the inner cutter and with one of the shear members moved radially inwardly and against the peripheries of the inner cutter blades.

Referring again to the drawing and in more detail, the shearing device illustrated in Figs. 1-4 comprises a rigid cylindrical rotary inner cutter made up of a plurality of flat bodied elliptical cutter blades 1 obliquely inclined to the axis of rotation, preferably close to a right angle therewith, and longitudinally spaced by elliptical spacing elements 2 of shorter axial dimensions than the cutter blades to provide circumferentially continuous radial hair-receiving slots in the cutter; the blade and spacer assembly is securely clamped at opposite longitudinal ends by end elements 3 forcibly fitted on the cylindrical shaft 4 rotatable on the outer conical pivot bearing 5 and in the flanged sleeve bearing 5', and is rotatable in the frame 6 which serves as a housing for the cutter. The flat sided blades are provided with transversely flat peripheries 7, peripheral edges on opposite sides of the peripheries and diametrically opposed cutting portions on the respective opposite peripheral sides of which are peripheral cutter edges which during rotation will present to an outer shear member cutter edges successively inclined in opposite oblique directions to the outer member. The inner cutter blades are easily tempered in the successful manner of flat blades generally without axial torque or distortion of crystalline structure and are easily sharpened and lapped to provide smooth surfaces and sharp cutting edges; their continuous peripheries rotatably glide smoothly on the shearing zone of the outer member without jars or blows and without causing the shearing zone of the outer member to bound to and fro as the inclined edges succeed each other and the direction of shear cut is changed; the change of direction of shear cut provides not only the advantage that a hair bent laterally in one direction by a blade is caught by the change of direction and cut, but has the further advantage that a hair in an opening, of an outer shear member, and which is adjacent to or more nearly adjacent to one portion of shearing edge than another portion of shearing edge opposite thereto has a better opportunity to be shorn close to the skin line before movement of the device by the user moves the particular opening away from the particular hair. The elliptical cutter blades may be easily manufactured by drilling a coaxial bore longitudinally through a cylindrical rod, to provide apertures for mounting the blades on the cylindrical shaft, and sawing or otherwise cutting off in oblique parallel planes transverse sections at the desired angle and of the desired thickness; or as will be apparent, the blades can be formed, by stamping, out of sheet metal; and may be presented in elliptical disc form, solid from their shaft receiving apertures radially outwardly to their peripheries; or, as shown herein, are presented in perforated elliptical disc form providing a plurality of circumferentially spaced periphery-supporting arms or spokes 8; the perforate areas provide relative reduction of weight of the blades, opportunity during manufacture to keenly sharpen portions of the peripheral edges, and during the shaving operation provide opportunity for cut hair to pass laterally beneath the peripheries, and during cleaning provide good opportunity for removal of hair from the inner cutter by blowing or brushing; the outer ends of the spokes serve also as fan blades setting up air currents tending to cool the outer shear member and inner cutter. Each of the inner cutter blades, at the inner end of a spoke is provided with a slot 9 to receive a longitudinal key mounted in a keyway in the shaft to secure the blades against relative rotation to each other and the shaft; the slots are open to the shaft receiving apertures 10 and are provided by transversely channelling the surrounding elliptically faced wall 11a of the shaft receiving apertures. The frame housing the inner cutter is provided with oppositely disposed end walls the forward ends of which are arcuately curved on a shorter radius than the peripheries of the cutter blades whereby the latter project radially outwardly from the plane of the arcuate walls, on the open side of the frame. Rearwardly and inwardly projecting relatively rigid marginal end portions 14 extend longitudinally and parallel on the frame at the upper and lower ends of the open side with the longitudinal edges of the marginal ends in engagement with the bottoms, or approximate bottoms, of groove walls provided by rearwardly and outwardly bent marginal end portions 13 extending longitudinally and parallel on opposite sides of the outer detachable resilient shear member 16 to support the outer member radially movable as a whole inwardly in the direction of the inner cutter during or after wear of the members, or if desired before wear, with the end edges of the outer member free to be moved inwardly so that the shearing zone of the outer member will be conformed to the cylindrical plane of the inner cutter without localized buckling in the shearing zone and particularly portions of its area on opposite sides of its center so that these portions throughout their localized areas may be held in intimate frictional engagement with the peripheries of the rotating blades by the weight of the device on the skin or by its being pressed against the skin by the user; the coaction of the respective marginal end portions minimizes the tendency of the thin outer shear member to be pulled arcuately in the direction of cutter travel by frictional engagement and of vibrating, or of a side end being pulled radially out of the frame by the cutter, or being dislodged from the frame by the resistance of the skin as the member is slidably moved thereon; and it is considered a shaving advantage to have the outer shear member thin, consequently relatively weak, and a manufacturing advantage, to avoid excessive grinding, to form the outer member from a thin sheet of metal of uniform, or approximately uniform thickness, resulting in thin marginal end portions which are weak; and it is a further advantage to the user for cleaning or renewing to have the marginal ends of the frame serve as guides or runners whereby the user can longitudinally slide the outer shear member into position without risk of jamming or causing the thin member to buckle in the relatively weak region of the hair-receiving openings. The outer shear member may be of normally arcuate shape, or may be in a normally flat plane intermediate its rearwardly bent marginal end portions and be flexed to arcuate form in its operative position. Pivotally mounted on opposite end walls of the frame are stop members 15 to removably hold the outer shear member, at opposite longitudinal ends of the rearwardly and outwardly bent marginal ends thereof, against longitudinal movement, or substantial longitudinal movement relative to the frame and to the inner cutter whereby the outer shear member is retained in longitudinal operative position with shear bars of its shearing zone positioned radially opposite the peripheral portions of the cutter blades which are at opposite ends of the major axes of the blades, and with opposite longitudinal ends of the outer member overhanging the end blades at opposite longitudinal ends of the inner cutter. The stop members also serve as guiding means for the outer member during radial movement of the outer shear member, and also provide conveniently manipulative means for opening the frame to remove the shear member. Longitudinal rows of shear bars 16a and narrow hair-receiving slots 17, in alternate relation, are provided in the outer shear member, the usual shearing edges being provided on the inner surface of the member at the inner sides of the slots; the shear bars are acutely inclined at a small angle to the cutting edges of the inner cutter, and are perpendicularly inclined to the axis of rotation of the cutter; the slots are adapted for the reception of relatively long as well as short hair, are coaxial with the axis of arcuate curvature of the outer member, and are directed perpendicularly of the axis of the device as a whole, facilitating the entry of hair therein as the head is slidably moved, or rolled, as the case may be on the skin, and facilitating comfortable manipulation by the user of the shear-cutting head on the skin of the neck, particularly the skin at the sides of the back of the neck; the slots and shear bars in the outer member constitute a shearing zone symmetrically disposed relative to the opposite ends and side edge of the outer member whereby the member can be positioned upside down, i. e. with its ends reversed, without reduction in area of its hair-receiving zone. Supporting the frame is a combined handle and housing for an electric motor encased within and connected with suitable electric wires 19 by which electric current is conveyed to operate the motor. The handle-housing, as will be noted, preferably slopes gradually inwardly radially and relatively deeply to a narrow necked-in portion which in turn flares outwardly to the frame-cutter casing; the shearing head is relatively short in proportion to the total length of the device; and the device as a whole is so shaped and proportioned as to facilitates manipulation of its head on the skin with a substantial portion of the cylindrical surface of the outer shear member in engagement with the skin, and to provide opportunity for this manipulation to be performed by the user holding the axis of the device vertically and moving the shearing head horizontally on the skin or by holding the device horizontally and moving it vertically.

In Figure 5, in which for purposes of illustration the angle of inclination of the cutter blade is shown somewhat larger, the cooperative shear-cutting action of the respective members is shown, and it will be seen that in clockwise rotation of the inner cutter the peripheral edges 7d on one peripheral side 7b of the blades will shear-cut with the shear bar edges 16b on the right side of the bars, and with the corner edges, and as rotation continues the peripheral edges 7c, on the diametrically opposed cutting portions of the blades and on the opposite peripheral sides 7a, will shear-cut with the shear bar edges 16c on the left side of the bars, and with the corner edges; as has been previously observed the preferred angle of inclination of the cutting edges to the axis of rotation is close to a right angle, and to the shearing edges of the shear bars close to parallel, resulting in the passage of a relatively long inner cutting edge against a hair, providing, so to speak, a draw-cut to cleanly sever tough, oily hair as well as dry brittle hair.

The inner cutter member is adaptable for shear-cutting cooperation with outer shear members having closely grouped hair-receiving openings of relatively small size, and in Fig. 6 the resilient outer shear member 16' is provided with a plurality of closely grouped, longitudinally and transversely spaced hair-receiving openings 17b of generally triangular shape and of relatively small size particularly suitable for the reception of relatively short and short hair and rapid shaving, presenting good opportunity for short hairs to project therein, presenting a long length of shearing edges relative to the area of shearing zone and a large number of wall or edge portions for erecting or guiding short hairs, especially when moved in a direction opposite to the direction of growth of short hair, and further presenting the opportunity for the user to manipulate the device as a hoe-like instrument for comfort and the convenience of unobstructed view; the inclined sides of the openings present an increased length of shearing edge relative to the lengths of the openings and are believed to have desirable advantage in erecting or guiding short hairs into the openings; the shearing edges of this member are as usual on the inner surface adjacent the openings, and the member is provided with rearwardly bent marginal end portions 13 of the same construction as the member 16; the length and width of the member 16' being the same as the member 16.

In Fig. 7, the resilient outer shear member 16" is adapted for shear-cutting cooperation with the inner cutter and is provided with a large number of closely grouped, longitudinally and transversely spaced hair-receiving openings 17c of generally square shape, and especially suitable for the reception of relatively short and short hair and rapid shaving; the shearing edges are on the inner surface adjacent the openings, and the member is provided with rearwardly bent marginal end portions 13 of the same construction as the member 16, the length and width of the member 16" being the same as the member 16; and the hair-receiving zones of the members 16' and 16" are similarly disposed symmetrically relatively to the ends and edges of the respective members as is the hair-receiving zone of the member 16.

In the construction shown in Fig. 8, the frame 6' is provided with two open sides diametrically opposite each other and diametrically opposed narrow bridging portions extending longitudinally from the outer end wall to the inner end wall, each of the bridging portions being provided on opposite longitudinal sides with the rearwardly and inwardly projecting marginal flanges 14 in engagement on their respective sides with the bottoms, or approximate bottoms, of the groove walls provided by the rearwardly and outwardly bent marginal end portions 13 of the outer detachable resilient shear members 16 and 16', which are held against longitudinal movement by the pivotally mounted stop members 15a, at opposite ends of the frame, each of the stop members in the instance being adapted to stop a marginal end of both outer shear members. As will be observed this construction provides two independently supported outer shear members, one of which is provided with quite differently shaped and arranged hair-receiving openings than the other, for example the outer shear member 16 is provided with the rows of slots adapted for the reception of relatively long as well as short hair, and the shear member 16' is provided with the small, closely grouped, longitudinally and transversely spaced hair-receiving openings adapted for the reception of relatively short and short hair, and for rapid shaving. Each of the outer shear members is supported for inward radial movement as a whole during wear of the shear-cutting members by the weight of the device on the skin or by its being pressed against the skin by the user, and intimate frictional engagement between the shear-cutting members thereby being maintained during the shaving operation, the end edges of the outer members being free to be moved inwardly to avoid buckling of either outer member.

In the construction shown in Figs. 9 and 10, in order to save maximum friction and wear on the outer shear member not immediately in use, in a dual structure, and to avoid resultant looseness in fit of the outer members, the arcuate, although not necessarily arcuate, resilient outer shear members are initially positioned with their inner surfaces barely spaced from the peripheries of the cutter blades, although as is clear they both can be in engagement with the inner cutter, if desired. The frame 6" is provided on the inner side of the narrow bridging portions 25 with means which cooperate with flanges 14, which serve on the outer side as retaining or holding bars to movably support the resilient flanges 13, to cause either member to arcuately flex when it is pressed against the skin and moved radially inwardly as a whole, and to cause either member to spring radially outwardly when the pressure upon it is released. The means employed are longitudinal members 6a slightly shorter than the outer members 25 and which have inclined surfaces herein shown as convex surfaces located behind and between flanges 14, which members can, if desired, be formed integral, as by molding with the frame, or adhesively secured to the inner surface of frame members 25, as by soldering. Said members 6a are of somewhat pointed oval shape in cross-section, of durable hard material, and smoothly polished outer surface. These convex surfaces are in engagement with flanges 13, preferably at or near the free ends of the latter, and provide inclined guiding surfaces on which flanges 13 may glide radially inward when forced in that direction. As will be noted external pressure on either outer shear member will force the member radially inwardly causing the convex surfaces to flex the resilient flanges 13 and reduce the radius of arcuate curvature of the shearing zone of the outer member putting the member under increased tension as friction of the cooperating shear-cutting members develops wear and compensating for the tendency to eccentricity between the cooperating shear-cutting members and thus eliminating "razor pull," and upon release of the pressure the relieved outer member will spring radially outwardly to its initial position automatically, the flanges 13 gliding outwardly on the convex surfaces of the longitudinal members 6a of the frame. In the outward movements of the shear members, as well as in the inward movements, the stop members 15a serve as guiding means, their inner sides presenting the guiding surfaces. In the dual structure the outer shear members, being of the same size, are interchangeable, and overhang the end blades at opposite longitudinal ends of the inner cutter to substantially the same extent, so that the outer members may be re-positioned by the user upside down, with the same side out, or in interchanged position. The shearing zones are symmetrically disposed between the ends of the respective members. As will be observed particularly on reference to Fig. 10 the arrangement and interaction of the parts provides a plurality of shear-cutting zones in which the generation of heat may be avoided in the shearing zone not immediately in use during the shaving operation while heat is being generated in the shearing zone in use by the frictional engagement of the rapidly moving inner cutter, and an important advantage results in that as the skin-engaging portions of either shear-cutting zone become too warm for the comfort of the user, he may change to the other zone allowing the first used zone to cool off, and alternately use the zones until the shaving operation is completed; a further advantage presented is the provision of opportunity for close, hard frictional engagement of the cooperating shear-cutting members irrespective of factors, or their relationship, such as mass of metal of the skin-engaging portions of the outer members, area of members in frictional contact, speed of the inner cutter, or pressure of one shear-cutting member against the other.

While in the preferred embodiment the inner cutter member is shown as a revolving cutter rotated by a relatively powerful motor, it will be understood that the inner cutter may be rocked or oscillated by any suitable means known in the art. The invention is susceptible to minor changes in structure, proportions and details without departure from its spirit and scope.

Having described the invention what is claimed is:

1. In an inner cutter of a shearing device of the class described, a flat blade, an aperture in the blade, rotatable means received in the aperture, means supporting the blade in a plane oblique to the axis of rotation, a peripheral cutting portion on the blade and coplanar with said aperture, and an arcuate cutter edge on the peripheral cutting portion of the blade.

2. In an inner cutter of a shearing device of the class described, a flat blade, an aperture in the blade, rotatable means received in the aperture, means supporting the blade in a plane oblique to the axis of rotation, diametrically opposite peripheral cutting portions on the blade and coplanar with said aperture, and an arcuate cutter edge on laterally opposite sides of the opposite cutting portions.

3. In an inner cutter of a shearing device of the class described, a flat blade, an aperture in the blade, rotatable means received in the aperture, means supporting the blade in a plane oblique to the axis of rotation, a continuously even and unbroken peripheral surface on said blade surrounding the axis of rotation and lying in the plane of the aperture, diametrically opposite arcuate peripheral cutting portions on the blade and coplanar with said aperture, and an arcuate peripheral cutter edge on laterally opposite sides of the opposed cutting portions.

4. In a shearing device of the class described, the combination of a perforated outer shear member, an inner cutter rotatably mounted, a plurality of longitudinally spaced radially projecting cutter blades included in the inner cutter, continuously even and unbroken peripheral surfaces, on said plurality of blades, surrounding the axis of rotation, diametrically opposite coplanar arcuate peripheral cutting portions on the blades lying in planes oblique to the axis of rotation, and arcuate peripheral cutter edges on laterally opposite sides of the opposed cutting portions of said blades.

5. In a shaving device of the class described, the combination of a perforated outer shear member, an inner cutter rotatably mounted, a plurality of flat blades included in the inner cutter, apertures in the blades, rotatable means received in the apertures, means supporting the blades longitudinally spaced and in parallel planes oblique to the axis of rotation, continuously even and unbroken peripheral surfaces, on said plurality of blades, surrounding the axis of rotation and lying in the planes of the respective apertures, diametrically opposite peripheral cutting portions on the blades lying in planes oblique to the axis of rotation and coplanar with the respective said apertures, and arcuate peripheral cutter edges on laterally opposite sides of said diametrically opposite cutting portions of said blades.

6. In a shearing device of the class described, the combination of an inner cutter rotatably mounted, a perforated, resilient outer shear member for shear-cutting cooperation with said inner cutter, and means supporting the outer shear member movable as a whole towards the inner cutter during wear of the shear-cutting members.

7. In a shearing device of the class described, the combination of an inner cutter rotatably mounted, a perforated, resilient outer shear member having an arcuate shearing zone for shear-cutting cooperation with said inner cutter, means supporting the outer shear member circumferentially disposed to the inner cutter and with its arcuate shearing zone movable radially inwardly towards the cutter during wear of the shear-cutting members, means to guide radial movement of the outer member, and means adapted to flex the outer shear member upon inward movement to reduce the radius of curvature of its arcuate shearing zone.

8. In a shearing device of the class described, the combination of an inner cutter rotatably mounted, a combined cutter housing and outer shear member frame having an open side, end wall portions in said housing-frame flush with opposite ends of said open side thereof, said inner cutter projecting laterally beyond said end wall portions, a perforated resilient outer shear member having an arcuate shearing zone for shear-cutting cooperation with said inner cutter on said open side, means supporting the outer shear member circumferentially disposed to the inner cutter and with its arcuate shearing zone movable radially inwardly towards the inner cutter during wear of the shear-cutting members, means to guide radial movement of the outer shear member, means adapted to flex the outer shear member upon inward movement to reduce the radius of curvature of its arcuate shearing zone.

9. In a shearing device of the class described, the combination of an inner cutter rotatably mounted, a plurality of longitudinally spaced, wheel-like blades included in the cutter, diametrically opposite arcuate peripheral cutting portions, lying in planes oblique to the axis of rotation, provided on said plurality of blades, an arcuate peripheral cutter edge on laterally opposite peripheral sides of the cutting portions of the respective blades, a combined cutter housing and outer shear member frame having an open side, end wall portions in said housing-frame flush with opposite ends of said open side thereof, said inner cutter projecting laterally beyond said end wall portions, a perforated resilient outer shear member having an arcuate shearing zone for shear-cutting cooperation with said inner cutter on said open side, means supporting the outer shear member circumferentially disposed to the inner cutter and with its arcuate shearing zone movable radially inwardly towards the inner cutter during wear of the shear-cutting members, means to guide radial movement of the outer shear member, and means adapted to flex the outer shear member upon inward movement to reduce the radius of curvature of its arcuate shearing zone.

10. In a shearing device of the class described, an elongated handle having a necked-in portion adjacent an end thereof, a combined inner cutter housing and outer shear member frame on said end of the handle and projecting axially of said necked-in portion of said handle, said housing-frame also projecting laterally of said necked-in portion of said handle and having an open side, an inner cutter movably rotatably mounted, a plurality of longitudinally spaced circumferentially disposed blades included in the inner cutter and having continuously even and unbroken peripheral surfaces, diametrically opposite peripheral cutting portions, lying in planes oblique to the axis of rotation, provided on said plurality of blades, an arcuate cutter edge on laterally opposite peripheral edges of the cutting portions of the respective blades, end wall portions in said housing-frame and flush with opposite ends of said open side thereof, said end wall portions projecting laterally of said necked-in portion of said handle and said inner cutter projecting laterally beyond said end wall portions, a perforated resilient outer shear member having an arcuate shearing zone for shear-cutting cooperation with said inner cutter on said open side of said housing-frame, means supporting the outer shear member circumferentially disposed to the inner cutter and with its arcuate shearing zone movable radially inwardly towards the inner cutter during wear of the shear-cutting members, means to guide radial movement of the outer shear member, and means adapted to flex the outer shear member upon inward movement to reduce the radius of curvature of its arcuate shearing zone.

11. In a shearing device of the class described, the combination of an inner cutter rotatably mounted, a plurality of perforated resilient outer shear members circumferentially arranged relatively to each other for shear-cutting cooperation with said inner cutter, means supporting the outer shear members circumferentially disposed to the inner cutter and movable independently radially inwardly towards the inner cutter during wear of the shear-cutting members, means to guide radial movement of the outer members, one of said outer shear members being provided with a plurality of combing and shearing bars formed by closely spaced columns of spaced hair-receiving slots, and a second outer shear member being provided with a plurality of shearing elements formed by spaced small hair-receiving openings in closely grouped rows.

12. In a shearing device of the class described, the combination of a combined cutter housing and outer shear member frame, an inner cutter rotatably mounted, a plurality of outer shear members adapted to cooperate with the inner cutter, each of the outer shear members movably supported for radial movement independently of each other and for radial movement alternately in opposite directions relatively to the inner cutter, either of said outer shear members adapted to be held in removable forced engagement with the inner cutter during the shaving operation by an externally applied force, means provided on the housing-frame and cooperative with the outer shear members to removably position either outer shear member out of shearing engagement with the cutter while the other outer shear member is engaged in the shaving operation, and means to guide radial movements of the outer members.

13. In a shearing device of the class described, the combination of a combined cutter housing and outer shear member frame, an inner cutter rotatably mounted, a plurality of resilient, perforated outer shear members, provided with arcuate shearing zones adapted to cooperate with the inner cutter, each of the outer shear members movably supported for radial translatory movement independently of each other and for radial movement alternately in opposite directions relatively to the inner cutter, either of said outer shear members adapted to be held in removable forced engagement with the cutter during the shaving operation by an externally applied force, means provided on the housing-frame and cooperative with the outer shear members to removably position either outer shear member out of shearing engagement with the cutter while the other outer shear member is engaged in the shaving operation, means adapted to flex the outer shear members upon inward movement to reduce the radius of curvature of their arcuate shearing zones, and means to guide radial movements of the outer members.

14. In a shearing device of the class described, the combination of a combined cutter housing and outer shear member frame, an inner cutter rotatably mounted, a resilient outer shear member provided with an arcuate shearing zone adapted for shear-cutting cooperation with the inner cutter, outwardly projecting marginal end portions at opposite sides of the outer shear member providing longitudinally extending grooves in said member, means on the housing-frame received longitudinally in said grooves and in engagement with the walls thereof movably supporting the outer shear member on its outer side, means on the inner side of the housing-frame cooperating with the marginal end portions of the outer shear member in movably positioning said member, said latter means including inwardly inclined surfaces on the housing radially behind the projecting marginal end portions of the outer shear member, and said inclined surfaces adapted to slidably guide said marginal ends of the outer shear member towards each other during wear of the shear-cutting members in cooperation with an external force applied to the outer shear member.

15. In a shearing device of the class described, the combination of a combined cutter housing and outer shear member frame, an inner cutter rotatably mounted, a plurality of resilient outer shear members provided with arcuate shearing zones adapted for shear-cutting cooperation with the inner cutter, outwardly projecting resilient marginal end portions on opposite sides of the outer shear members providing longitudinally extending grooves in said members, means on the housing-frame received longitudinally in said grooves and in engagement with the walls thereof movably supporting the shear members on their outer sides, means on the inner side of the housing-frame cooperating with said resilient marginal end portions of the outer shear members for movably positioning said members, said latter means including inwardly inclined surfaces on the housing-frame radially behind said projecting resilient marginal end portions of the outer shear members, said inclined surfaces adapted to slidably guide said marginal end portions of the outer shear members and towards each other in cooperation with external force applied on the outer shear members and to arcuately flex said shear members to reduce the radius of arcuate curvature of their shearing zones during wear of the cooperating shear-cutting members, said inclined surfaces also adapted to cooperate, upon withdrawal of applied force, with the projecting resilient marginal end portions to relieve the tension of the outer shear members and to re-position said outer shear members radially outwardly of the inner cutter, and means to longitudinally guide radial translatory movements of the outer shear members.

16. In a rotatably mounted inner cutter of a shearing device of the class described, a cutter blade projecting circumferentially continuously and having an unbroken peripheral surface, diametrically opposite arcuate cutting portions on said cutter blade obliquely inclined to the axis of rotation thereof, and an arcuate cutting edge on laterally opposite peripheral edges of said cutting portions of said cutter blade.

17. In a shearing device of the class described, the combination of an outer shear member having an arcuate shearing portion, shearing elements formed in said outer shear member by spaced perforations in said shearing portion thereof, an inner cutter rotatably mounted for shear-cutting cooperation with said outer shear member and shaped for circumferentially continuously presenting peripheral areas to said shearing portion of said outer shear member for arcuately supporting said shearing portion on its inner side, arcuate cutting portions on diametrically opposite sides of said inner cutter longitudinally spaced on their respective sides thereof by transverse slots obliquely disposed to the axis of rotation of said inner cutter, and arcuate cutting edges, on peripheral edges of said cutting portions, acutely inclined on said opposite sides of said inner cutter in the same oblique direction relatively to the axis of rotation for rotarily presenting said cutting edges to said shearing portion of said outer shear member in successively opposite oblique directions.

18. In a shearing device of the class described, the combination of an outer shear member having an arcuate shearing portion, shearing elements formed in said outer shear member by spaced perforations in said shearing portion thereof, an inner cutter rotatably mounted for shear-cutting cooperation with said outer shear-member, circumferentially continuous cutter blades having circumferentially continuous peripheries spaced in said inner cutter by circumferentially continuous transverse slots, diametrically opposite coplanar arcuate cutting portions on said cutter blades lying in planes oblique to the axis of rotation of said inner cutter and close to a right angle to said axis, and arcuate cutting edges on laterally opposite peripheral edges of said diametrically opposite cutting portions of said cutter blades.

19. In a shearing device of the class described, the combination of an outer shear member frame having inwardly projecting flanges defining transversely opposite sides of a slot in said frame, an outer shear member having an arcuate shearing portion, outwardly projecting flanges in said outer shear member forming external grooves on transversely opposite sides of said shearing portion thereof, said outwardly projecting flanges being disposed in said frame behind said inwardly projecting flanges thereof and with said inwardly projecting flanges of said frame projecting into said external grooves of said outer shear member and cooperative with said outwardly projecting flanges thereof for supporting said outer shear member against substantial outward radial movement relatively to said slot, shearing elements formed in said outer shear member by spaced perforations in said shearing portion thereof, a movable inner cutter having an arcuate shearing portion, and shearing elements in said inner cutter spaced by slots extending transversely of said shearing portion thereof and disposed behind said shearing portion of said outer shear member.

20. In a shearing device of the class described, the combination of a plurality of outer shear members each having a shearing portion, shearing elements formed in said outer members by spaced perforations in said shearing portions thereof, an inner cutter movably mounted for shear-cutting cooperation with said outer shear members, shearing elements in said inner cutter spaced by slots extending transversely in said inner cutter and disposed behind said shearing portions in said outer members, and means mounting said outer shear members each slidably movable as a whole for radial-like inward and outward movements relatively to said inner cutter.

21. In a shearing device of the class described, the combination of an outer shear member frame having inwardly projecting flanges defining transversely opposite sides of spaced slots, inwardly inclined guiding surfaces in said frame located behind said projecting flanges thereof and forming with said flanges longitudinal internal grooves, outer shear members having perforated shearing portions disposed opposite said slots and having outwardly projecting resilient flanges on opposite sides of said shearing portions thereof projecting into said internal grooves of said frame and cooperating with said inwardly projecting flanges for supporting said outer shear members against substantial outward movement relatively to said slots and with the said resilient flanges of said outer shear members disposed opposite said guiding surfaces, means cooperative with said outer shear members for retaining said shear members substantially against longitudinal movements in said slots, shearing elements formed in one of said outer shear members by spaced slots, in said shearing portion thereof, adapted to receive relatively long and short hairs, shearing elements formed in a second of said outer shear members, in said shearing portion thereof, by small perforations, closely grouped, adapted to receive relatively short and short hairs and for rapid shaving, a movable inner cutter having shearing portions for shear-cutting cooperation with said outer shear members, and shearing elements in said inner cutter spaced by slots extending transversely of said shearing portions thereof and disposed behind said perforated shearing portions of said outer shear members.

22. In a shearing device of the class described, the combination of a plurality of outer shear members each having a shearing portion, shearing elements formed in said outer members by spaced perforations in said shearing portions thereof, an inner cutter movably mounted for shear-cutting cooperation with said outer shear members, shearing elements in said inner cutter spaced by slots extending transversely in said inner cutter and disposed behind said shearing portions of said outer members, means movably supporting said outer shear members out of engagement with said inner cutter and for relatively independent radial-like inward and outward movements into and out of engagement with said inner cutter, yieldable means for resiliently resisting said radial-like inward movements of said outer members, and means cooperative with said outer members for guiding said members in said radial-like inward and outward movements.

23. In a shearing device of the class described, the combination of an outer shear member frame having inwardly projecting flanges defining transversely opposite sides of spaced slots in said frame, inwardly inclined guiding surfaces in said frame located behind said projecting flanges thereof and forming with said flanges longitudinal internal grooves, outer shear members formed of sheet metal and having transversely curved shearing portions circumferentially disposed on opposite sides of said frame and opposite said slots thereof, outwardly projecting resilient flanges in said outer members on transversely opposite sides of said shearing portions thereof projecting into said internal grooves of said frame and cooperating with said inwardly projecting flanges thereof for supporting said outer shear members against substantial outward movement relatively to said slots and with the said resilient flanges of said outer shear members disposed opposite said guiding surfaces of said frame, said slots and said internal grooves of said frame having their longitudinal ends open for longitudinal insertion and removal of said outer shear members, movable stop members pivotally supported on said frame for opening and closing the longitudinal ends of said internal grooves and cooperative with said outer shear members for retaining said shear members substantially against longitudinal movements in said slots and for laterally guiding radial-like movements of said outer members relatively to said frame, shearing elements formed in one of said outer shear members by closely grouped spaced perforations in said shearing portion thereof, transverse combing and shearing bars formed in the opposite outer shear member by longitudinal rows of transverse slots, said transverse slots having their long dimensions extending substantially perpendicular to the axis of curvature of said opposite outer shear member and being arranged in longitudinally spaced substantially perpendicular columns in said shearing portion thereof and with alternate rows of said slots longitudinally offset to adjacent rows and forming columns vertically offset to adjacent columns whereby the slots in said alternate rows transversely overlap the slots in said adjacent rows by extending into the combing and shearing bars formed thereby, a movable inner cutter having oppositely disposed curved shearing bar portions for shear-cutting cooperation with said outer shear members, means mounting said inner cutter in radially spaced relation to said outer shear members with the shearing portions of said inner cutter radially opposite said outer shear members, said mounting means supporting said inner cutter against bodily movement radially to said outer members, arched arcuate shearing bar portions in said inner cutter obliquely disposed to the shearing portions of said outer shear members and bridging hollow areas in said inner cutter, transversely oblique slots in said inner cutter spacing said shearing bar portions thereof and meeting with said hollow areas of said inner cutter, and arcuate shearing edges in said inner cutter on peripheral edges of said shearing bar portions thereof, said shearing edges in said inner cutter being obliquely inclined to said shearing portion of said one of said outer members and being inclined slightly acute to the shearing edges of said combing and shearing bars of said opposide outer shear member.

24. In a shearing device of the class described, the combination of an outer shear member having a transversely curved shearing portion of extremely thin sheet metal, shearing elements formed in said outer member by closely grouped spaced perforations in said shearing portion thereof, an inner cutter rotatably mounted for shear-cutting cooperation with said outer shear member and shaped for circumferentially continuously presenting peripheral areas to said shearing portion of said outer member for arcuately supporting said shearing portion thereof on its inner side, a substantially longitudinally extending tubular hollow portion in said inner cutter, transverse peripheral cutting elements in said inner cutter on diametrically opposite sides thereof and longitudinally spaced on their respective sides thereof by transverse slots obliquely disposed to said curved shearing portion of said outer shear member and to the axis of rotation of said inner cutter and inclined in the same oblique direction relatively to said axis and meeting with said hollow portion of said inner cutter, and arcuate cutting edges in said inner cutter on relatively laterally opposite peripheral edges of said peripheral cutting elements, and acutely inclined relatively close to a right angle on opposite sides of said inner cutter to the axis of rotation thereof and in the same oblique direction relatively to said axis of rotation for rotarily presenting said cutting edges to said shearing portion of said outer shear member in successively opposite oblique directions, said outer shear member being circumferentially disposed to said inner cutter.

25. In a shearing device of the class described, the combination of an outer shear member having a transversely curved shearing portion of sheet metal, shearing bars formed in said outer member by spaced slots arranged in columns in said shearing portion thereof, an inner cutter rotatably mounted for shear-cutting cooperation with said shearing bars of said outer member and shaped for circumferentially continuously presenting peripheral areas to said shearing portion of said outer member for arcuately supporting said shearing portion thereof on its inner side, a substantially longitudinally extending hollow portion in said inner cutter, diametrically opposite coplanar peripheral cutting elements in said inner cutter spaced on their respective sides thereof by transverse slots obliquely disposed to the axis of rotation of said inner cutter and meeting with said hollow portion thereof, and arcuate cutting edges in said inner cutter on relatively opposite lateral peripheral edges of said diametrically opposite cutting elements thereof and acutely inclined at slightly less than a right angle to the axis of rotation of said inner cutter for rotarily presenting said cutting edges of said inner cutter to said shearing portion of said outer shear member in successively opposite oblique directions, said outer shear member being circumferentially disposed to said inner cutter.

26. In a shearing device of the class described, an outer shear member frame, outer shear members having transversely curved shearing portions of sheet metal circumferentially disposed on opposite sides of said frame, shearing elements formed in one of said outer members by closely grouped spaced perforations in said shearing portion thereof, transverse combing and shearing bars formed in the opposite outer shear member by longitudinal rows of transverse slots having their long dimensions disposed substantially perpendicular to the axis of curvature of said outer member and being arranged in longitudinally spaced vertical columns in said shearing portion thereof and with alternate rows of said slots longitudinally offset to adjacent rows and forming columns vertically offset to adjacent columns whereby the slots in said alternate rows transversely overlap the slots in said adjacent rows by extending into the combing and shearing bars formed thereby, an inner cutter rotatably mounted for shear-cutting cooperation with said outer shear members and shaped for circumferentially continuously presenting peripheral areas to said shearing portions of said outer shear members for arcuately supporting the shearing portion on the inner side of either of said outer members, a substantially longitudinally extending hollow portion in said inner cutter, diametrically opposite coplanar arcuate peripheral cutting portions in said inner cutter longitudinally spaced on their respective sides thereof by transverse slots obliquely disposed to the axis of rotation of said inner cutter and meeting with said hollow portion thereof, arcuate cutting edges in said inner cutter on relatively opposite lateral peripheral edges of said diametrically opposite cutting portions and acutely inclined at slightly less than a right angle to the axis of rotation for rotarily presenting said cutting edges to said shearing portions of said outer members in successively opposite oblique directions, said cutting edges of said inner cutter being inclined slightly acute to the shearing edges of said combing and shearing bars in the said opposite outer shear member, and means supporting said outer shear members bodily movable radially relatively to said inner cutter and independently of each other, at least one of said outer shear members being movably supported with its shearing portion out of engagement with and movable into engagement with said inner cutter.

JOHN T. SCULLY.